W. H. DIFFENDALL.

STAY BOLT HEADING ATTACHMENT FOR PNEUMATIC HAMMERS, &c.

APPLICATION FILED JULY 17, 1918.

Reissued Mar. 11, 1919.

14,606.

Inventor:

Walter H. Diffendall, by Spear Middleton, Donaldson & Spear

Atty's.

HARRIS PETERS CO., PHOTO-LITHO., WASHINGTON, D. C.

UNITED STATES PATENT OFFICE.

WALTER H. DIFFENDALL, OF HAGERSTOWN, MARYLAND, ASSIGNOR, BY MESNE ASSIGNMENTS, TO THE LIBERTY TOOL COMPANY, A CORPORATION OF MARYLAND.

STAY-BOLT-HEADING ATTACHMENT FOR PNEUMATIC HAMMERS, &c.

Specification of Reissued Letters Patent. Reissued Mar. 11, 1919.

14,606.

Original No. 1,233,560, dated July 17, 1917, Serial No. 154,209, filed March 12, 1917. Application for reissue filed July 17, 1918. Serial No. 245,425.

*To all whom it may concern:*

Be it known that I, WALTER H. DIFFENDALL, a citizen of the United States, residing at Hagerstown, in the county of Washington and State of Maryland, have invented certain new and useful Improvements in Stay-Bolt-Heading Attachments for Pneumatic Hammers, &c.; and I hereby declare that the following is a full, clear, and exact description thereof, reference being had to the accompanying drawings, which form part of this specification.

This invention is an improvement in stay-bolt heading attachments for pneumatic or fluid actuated hammers, which attachment enables the ordinary pneumatic hammers to be used for heading stay-bolts, countersunk rivets, etc., in sheet metal work and structural steel iron work.

The invention in particular is an improvement upon the attachment shown in my Patent No. 1,211,554, of January 9, 1917, and the object of the invention is to enable the attachment to be handled as a unit so the parts thereof will not separate or drop apart when the attachment is detached from the hammer. I will explain the invention more fully with reference to the accompanying drawings in which.

Figure 1:
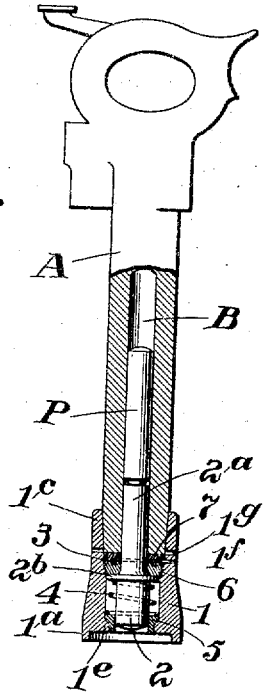
Figure 1 is a conventional view of a pneumatic hammer showing the attachment applied thereto in section.
Figure 2:
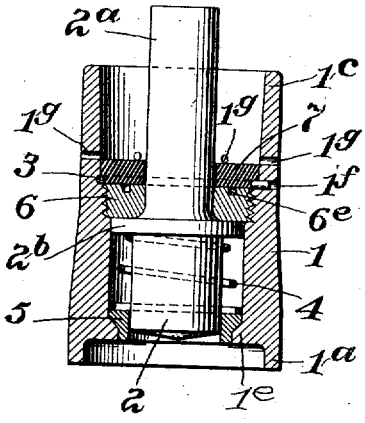
Fig. 2 is an enlarged sectional view of the attachment detached.
Figure 3:
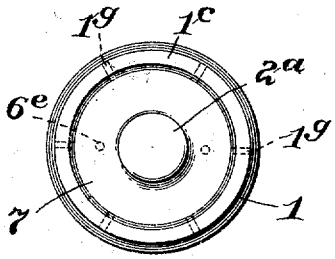
Fig. 3 is a top plan view of Fig. 2.
Figure 4:
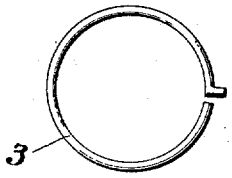
Fig. 4 is a detail view of the locking ring.

Referring to the drawings, A designates a pneumatic, or other fluid operated, hammer which may be of any suitable construction, and as shown has a barrel B in which is a plunger P that is adapted to be operated by the fluid action in the usual manner.

My novel attachment is adapted to be detachably fitted onto the lower end of the barrel B of such a hammer and as shown comprises a tubular cylindric casting 1, having a sleeve portion $1^c$ on its upper end forming a socket adapted to receive the lower end of the barrel B; so that the attachment may be readily slipped onto the end of the barrel B and be retained in position thereon by the close fit, or by other suitable means. The attachment can be made to fit the end of the barrel of the hammer with which it is to be used without requiring any alteration in the barrel.

On the lower end of this casting is an annular flange $1^a$, which surrounds or forms a recess in the lower end of the casting, said recess being preferably considerably larger in diameter than the head of the bolt or rivet to be formed.

Within the casting 1 near the center thereof is a preferably removable partition 6, which as shown may be exteriorly threaded to engage corresponding internal threads in the casting. The partition 6 can be locked in position by any suitable means. As shown a metal locking ring 3 is arranged above the partition 6, one end of this ring being engaged with an opening $1^f$ in the casting and the partition 6 may be chamfered on its edge next to the ring so that it will tend to spread the ring outwardly against the casing.

The partition 6 has a central opening through which passes the shank $2^a$ of a ram 2, which ram has a central flange $2^b$ adapted to abut against the under side of the partition 6 and limit the upward movement of the ram 2. The lower end of the ram 2 is guided by an annular bushing 5 which is fitted into the lower end of the casting 1, which as shown has an internal flange or constriction $1^e$ upon which bushing 5 is seated.

The bushing 5 is preferably made of hardened steel and has a pressed fit in the casting 1 but has a free working fit around the ram 2. This bushing 5 can be removed and replaced in case of excessive wear between it and the ram.

The partition 6 is also preferably made of hardened steel and has a working fit around the shank $2^a$ of the ram and acts as a retainer for the ram and also limits the extent of telescopic fit of the casting onto the barrel of the hammer. The bushing 6 may be removed and replaced when desired by means of an ordinary socket wrench which can be engaged with holes $6^e$ in the top side of the bushing as shown.

A taper coil spring 4 is placed in the lower part of the casting around the ram and between the flange $2^b$ on the ram and the bushing 5. This coil spring 4 is not used as a shock absorber, but is used to return the ram (after being depressed) to its normal raised position. It is preferably tapered, so that in case the casting 1 should be improperly placed and the hammer plunger P should drive the ram or die 2 to the full length of its stroke, the taper coil spring 4 will collapse into a very small space and not break. If an ordinary coil spring was used one coil of the spring would lap over another and cause it to break if unduly compressed; but with the taper coil spring there is no lapping, and it is not so liable to breakage.

A yieldable cushion or washer 7, preferably made of rubber is placed within the casting above partition 6 and has a loose fit around the shank $2^a$, of the ram. This washer acts as a shock absorber between the hammer and the attachment and saves wear on the end of the hammer barrel and on the partition 6.

The casting is preferably provided with a series of holes $1^g$ above this washer to permit escape of air when the attachment is applied to the hammer. Without these holes air could not readily escape and would tend to displace the sleeve.

The attachment is applied to the hammer as indicated in Fig. 1, and may be used in heading bolts and rivets as explained in my aforesaid patent. It will be seen that with this attachment the parts are self-contained and can be handled as a unit when detached from the hammer, all parts being confined to and within the casting 1.

What I claim is:

1. A stay-bolt heading attachment for pneumatic hammers comprising a one-piece tubular body, a removable transverse partition in said body having a central opening, and with a socket above the same to receive the hammer barrel, said attachment having a constriction at the lower end of the body, a ram in the said body guided by the said constriction and having a shank extending through the opening in the partition, said ram having a flange larger in diameter than either the constriction or the opening in the partition, and located between said partition and constriction, whereby the ram and the body are maintained as one unit, said flange being so located that the lower end of the ram can withdraw into the constriction and a flange on the tubular body projecting beyond the plane of the constriction and of larger diameter than the same, substantially as described.

2. A stay-bolt heading attachment for pneumatic hammers comprising a one-piece tubular body provided with means for attaching the same removably to the barrel of the hammer, said body carrying a ram slidably with means for limiting the movement of the ram in both directions in relation to the body and maintaining said ram in connection with the body to be handled therewith as one unit, said limiting means including a transverse partition arranged at an intermediate point in the length of said body, a constriction at the lower end of the body and a flange on the ram located between the partition and the constriction, substantially as described.

3. A stay-bolt heading attachment for pneumatic hammers comprising a body provided with means for attaching the same removably to the barrel of the hammer, said body carrying a ram slidably with means for limiting the movement of the ram in both directions in relation to the body and maintaining said ram in connection with the body to be handled therewith as one unit, a part of said limiting means being within the body and removable therefrom to permit the ram to be removed, substantially as described.

4. A stay-bolt heading attachment for pneumatic hammers, comprising a tubular body with a perforated partition extending transversely thereof intermediate its length and having a socket above the partition to receive the hammer barrel, said body having a constriction at its lower end, a ram having its shank passing through the perforation in the partition and having a flange to strike upon the under side of said partition, said flange being of larger diameter than the constriction, and a resilient washer above the said partition, said ram being slidably mounted in the body, but confined thereto within certain limits of movement, to be maintained therewith as one unit.

5. A stay-bolt heading attachment for pneumatic hammers comprising a one-piece tubular body having a downwardly directed circular flange at its lower end with an axial opening of less diameter than the flange, a bushing in said opening having a shoulder resting on an internal shoulder of the body about said axial opening, a removable perforated partition extending across said body and spaced apart from said bushing, leaving a chamber between them, a ram guided in the bushing and having a flange of larger diameter than the openings in the partition and bushing, said body having a socket above the partition to receive the barrel of the hammer, substantially as described.

6. A stay-bolt heading attachment for pneumatic hammers, comprising a tubular body having a central partition with a central opening to guide the shank of a ram, a socket above the partition for the reception of the end of the hammer barrel and a constriction in the lower end of the body; a ram in the body guided by said constriction and having a shank extending through the opening in the partition, and a flange below the partition to limit its upward movement; and a coil spring interposed between the flange and the constriction to return the ram to normal position.

7. A stay-bolt heading attachment for pneumatic hammers comprising a tubular body having a socket in its upper end; an approximately centrally disposed partition in said body, said partition having a central opening; an annular bushing in the lower end of the body; a ram having its lower end guided in said bushing and having a shank portion extending through and guided by the opening in the partition and having a flange beneath the partition, and a coil spring surrounding the ram and interposed between the flange and the bushing.

8. A stay-bolt heading attachment for pneumatic hammers comprising a cylindric body having a central partition provided with a central opening to guide the shank of a ram, a socket above the partition for the reception of the end of the hammer barrel, a constriction in the lower end of the body, a ram in the body guided in said constriction and having a shank extending through the opening in the partition, and a flange below the partition to limit its upward movement, and a taper coil spring interposed between the flange and the construction in the body to return the ram to normal position.

9. A stay-bolt heading attachment for pneumatic hammers comprising a tubular cylindric body having a socket in its upper end, and a constriction near its lower end, an approximately centrally disposed partition in said body; said partition having a central opening, an annular bushing fitted in the body at the constriction; and a ram having its lower end guided in said bushing and having a shank portion extending through and guided by the opening in the partition and having a flange beneath the partition, and a taper coil spring surrounding the ram and interposed between the flange and the bushing.

10. A stay-bolt heading attachment for pneumatic hammers, comprising a tubular body having a socket in its upper end, a constriction near its lower end, and approximately centrally disposed partition having a central opening; said body having perforations above the partition; an annular bushing fitted in the body at the constriction, a ram having its lower end guided in said bushing and having a shank portion extending through and guided by the opening in the partition and a spring for raising the ram, and a cushion in the body above the partition.

11. A stay-bolt heading attachment for pneumatic hammers comprising a tubular body having a socket in its upper end, a constricting flange near its lower end; an approximately centrally disposed partition removably secured in said body, and having a central opening; an annular bushing fitted in the body at the constriction; a ram having its lower end guided in said bushing and having a shank portion extending through and guided by the opening in the partition and having a limiting flange beneath the partition, a taper coil spring surrounding the ram and interposed between the flange and the bushing, and a cushioning washer in the body above the partition and surrounding the shank of the ram.

12. A stay-bolt heading attachment for pneumatic hammers, comprising a cylindric tubular body having a flange on its lower end surrounding a large recess therein, an internal constriction above this flange; a removable partition screwed into the body near the center thereof, said partition having a central opening; an annular bushing pressed into said body at said constriction; a ram having its lower end guided in said bushing and having a shank projecting through the opening in the partition and having a flange below the partition to limit its upward movement; and a coil spring surrounding the ram and interposed between said flange and said bushing to lift the ram.

13. A stay-bolt heading attachment for pneumatic hammers etc. comprising a tubular body having a flange on its lower end surrounding a large recess therein, an internal constriction above this flange; a removable partition screwed into the body near the center thereof, said body having a central opening; said body having perforations above the partition; an annular bushing pressed into said body and fitted on the said constriction; a ram having its lower end guided in said bushing and a shank projecting through the opening in the partition and a flange below the partition to limit its upward movement; a taper coil spring surrounding the ram and interposed between said flange and said bushing to lift the ram, and an annular cushioning washer in the body above the partition.

In testimony whereof I affix my signature.

WALTER H. DIFFENDALL.

Copies of this patent may be obtained for five cents each, by addressing the "Commissioner of Patents, Washington, D. C."